United States Patent [19]
Barger et al.

[11] 4,166,940
[45] Sep. 4, 1979

[54] DUAL-GAS SHIELDING METHOD

[75] Inventors: John J. Barger, Ringgold; Clarence W. Overby, Rossville, both of Ga.

[73] Assignee: Combustion Engineering, Inc., Windsor, Conn.

[21] Appl. No.: 953,811

[22] Filed: Oct. 23, 1978

Related U.S. Application Data

[63] Continuation of Ser. No. 670,928, Mar. 26, 1976, abandoned.

[51] Int. Cl.² .............................................. B23K 9/16
[52] U.S. Cl. ......................................... 219/74; 219/75
[58] Field of Search .................................... 219/74, 75

[56] References Cited
U.S. PATENT DOCUMENTS

| | | | |
|---|---|---|---|
| 2,859,329 | 11/1958 | Lesnewich | 219/74 |
| 2,903,559 | 9/1959 | Wempe | 219/74 X |
| 2,919,341 | 12/1959 | Roth | 219/74 |
| 3,053,954 | 9/1962 | Gorman | 219/74 |
| 3,495,066 | 2/1970 | Broyard | 219/74 |
| 3,692,973 | 9/1972 | Oku | 219/75 X |

*Primary Examiner*—E. A. Goldberg

[57] ABSTRACT

The disclosure of the present application relates to an improved method of open-arc welding. According to the present method, the outer shield of a double-shield welding system consists of a stream of gas formed in a shield concentric with the inner shield. This method is distinguished by the fact that atmospheric air may be used as the outer shield gas because the outer-shield velocity is so regulated and so positioned as to prevent the air from being drawn into the weld area, the outer shield gas velocity nearly approximating the inner shield gas velocity.

2 Claims, 3 Drawing Figures

DUAL-GAS SHIELDING METHOD

This is a continuation of application Ser. No. 670,928, filed Mar. 26, 1976 now abandoned.

BACKGROUND OF THE INVENTION

In the art of arc welding it has been found to be necessary to take steps to prevent the inclusion of contaminants such as water vapor in the weld. In particular, it has been observed that water vapor has a tendency to cause porosity in the weld area. A popular method of prevention has been to surround the welding tip with a shield of inert gas. In certan environments, however, it was found that the width of shield required resulted in a high volume rate of flow of the costly inert gas, so various other schemes for increasing the isolation of the weld from contaminants have been investigated. Among these have been several double-shield systems, such as Wempe, U.S. Pat. No. 2,903,559, which employs shielding gases other than air.

SUMMARY OF THE INVENTION

The present invention relates to a method by which a shield of ordinary air can be used to eliminate porosity. According to the present invention, ordinary air, even air having 100% relative humidity, will afford a marked improvement in welding results over those provided by a single-shield system if the velocity of the air is approximately equal to that of the inert gas in the inner shield and the outer gas shield is separated from the inner gas shield until the gases leave the welding cup and is positioned beyond the outside of the plasma "bell" that forms between the welding cup and the workpiece during welding.

DETAILED DESCRIPTION OF THE PREFERRED EMBODIMENT

Figure 1:
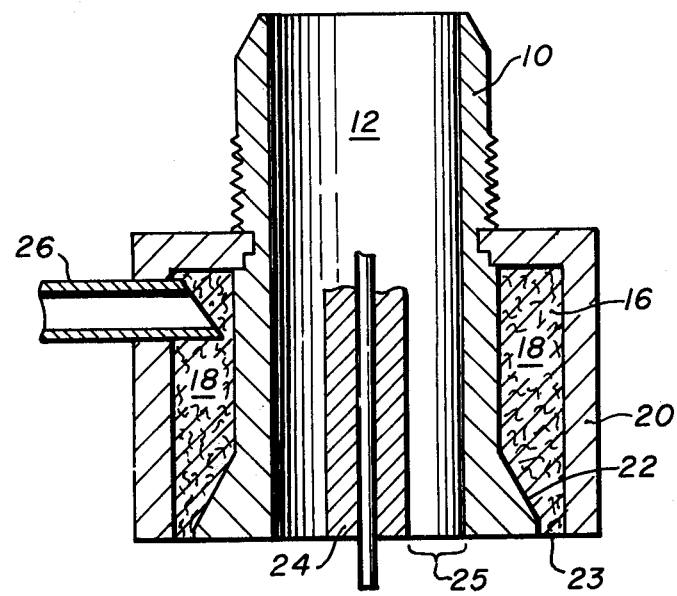
FIG. 1 is a sectional view of a welding cup for use with the method of this invention.

In FIG. 1, inner chamber 12 is formed by the inside surface of cylindrical wall 10. In a typical apparatus, the cross section of chamber 12 may have a radius of 5/16". An outer chamber 18 is formed by the outer cylindrical wall 20 and the outer surface of cylindrical wall 10, and this chamber is filled with a material 16 suitable for acting as a diffuser, such as stainless steel wool. Outer wall 20 is penetrated by gas passage 26. A typical radius of the cross section of chamber 18 would be ⅜". Cylindrical wall 10 terminates in separating member 22, which serves to separate the outer shield from the inner shield until the gases leave the welding cup and keep the outer shield beyond the outside of the plasma "bell" that forms between welding tip 24 and the workpiece during welding. A typical separating member could have a radius of 9/16".

During operation, the inner-shield gas, typically argon or another inert gas, is introduced into inner chamber 12 by a method familiar to the art. The gas travels down inner chamber 12 and out its exit, welding cup 25, shielding the welding tip 24, which might have a 3/16" radius. The outershield gas, of which, according to the present invention, at least a major portion is ordinary air, is introduced from a suitable source into gas passage 26, through which it passes to outer chamber 18. The gas entering chamber 18 has a horizontal bulk velocity because of its travel along gas passage 26. This horizontal flow is broken up by stainless-steel-wool diffuser 16, increasing the static air pressure in outer chamber 18, which in turn causes a bulk velocity at exit 23 of chamber 18 due to the diffusion which results from the static-pressure difference between chamber 18 and the ambient atmosphere. An equilibrium is established between the volume of gas entering through gas passage 26 and that leaving exit 23, so the velocity of the gas leaving exit 23 can be regulated by controlling the volume rate of the gas entering outer chamber 18. With a welding-cup-to-workpiece distance of ⅛", the volume rate at which gas is supplied to inner chamber 12 is between 11 ft.$^3$/hr. and 13 ft.$^3$/hr. Between 15 ft.$^3$/hr. and 20 ft.$^3$/hr. of gas is supplied to outer chamber 18. Taking into account the sizes of exits 23 and 25, this gives a range of ratios of outer-shield gas velocity to inner-shield gas velocity of 0.8 to 1.5, which is the range that produces the best results. While the method of the present specification can be practiced with outer-shield velocities which give velocity ratios outside this range, significant deterioration in results can be expected outside a ratio range of approximately 0.5 to 2.0, which translates to velocities in the outer shield in the range of 100 ft./min. to 250 ft./min.

With a wider separating member 22, the velocity ratios become less critical. This, of course, alters the required velocity ratio somewhat from that quoted above. Nevertheless, optimum results will still be found in the range quoted. In addition, those skilled in the art will appreciate that increased velocities are required when the cup-to-workpiece spacing increases.

Figure 2:
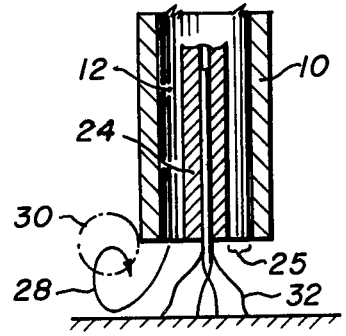
FIG. 2 is a diagram of the gas flow from a single-shield welding system.

The mechanism by which the method of the present invention works has not been conclusively determined, but the following possible explanation is offered. In a single-shield welding cup as shown in FIG. 2, gas leaving exit 25 is thought to flow in a path similar to that depicted by curved arrow 28. In the area indicated by arrow 30, air from the surrounding atmosphere is drawn into the shield-gas flow with the result that ambient air is drawn into plasma "bell" 32 if the shield diameter is not relatively large. In such a situation it has been found that porosity occurs when the humidity in the air reaching plasma bell 32 is at least at a −10° C. dew-point level.

Figure 3:
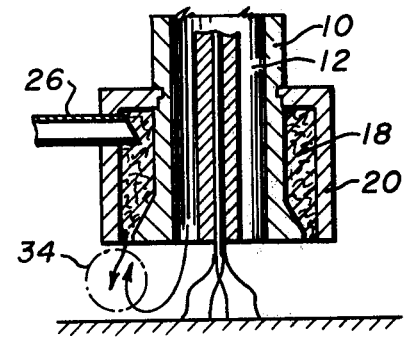
FIG. 3 is a diagram of the gas flow from a double-shield system used according to the method of the present invention.

According to the present invention, gas leaves inner chamber 18 of FIG. 3 in the same manner as it leaves the single-shield welding cup of FIG. 2. As a result, there exists a tendency for a flow pattern to result which is similar to that shown in FIG. 2. However, the presence of an outer shield formed in accordance with the present invention and having a velocity in the range dictated by the present invention is thought to have the effect of breaking up this pattern without disturbing the plasma bell. Thus, since the tendency of the inner-shield stream to draw air into the plasma bell is overcome by the outer stream, the choice of gas for the outer stream is relatively unimportant, so even ordinary air can be used in the outer stream. As will be appreciated by those skilled in the art, the inner-shield gas velocity in area 34 must be adjusted for factors such as the area of the shield and the distance between the welding cup and the workpiece; the precise optimum velocity relationship for any welding setup can therefore only be achieved by adjusting the outershield velocity within a range dictated by the method of the present invention until the best results are observed.

What is claimed is:

1. In the method of arc welding that includes shielding the plasma "bell" formed between a welding cup and a workpiece by forming at least two concentric gas shields by emitting from the welding cup gas streams which are physically separated until they leave the welding cup, the inner gas shield thereof comprising an inert gas, the improvement comprising:

a. forming an outer gas shield with a gas stream in which at least half the gas is air;
   b. separating the outer gas shield from the inner gas shield at the exit of the welding cup such that the outer gas shield is kept beyond the outside of the plasma "bell" formed between the welding cup and the workpiece during welding; and
   c. causing the outer gas shield gas stream to exit the welding cup at a velocity approximately equal to the inner gas shield gas stream velocity at the welding cup exit.

2. The method as recited in claim 1 wherein causing the outer gas shield gas stream to exit the welding cup at a velocity nearly approximating the inner gas shield gas stream velocity at the welding cup exit comprises: causing the outer gas shield gas stream to exit the welding cup at a velocity of 100 ft./min. to 250 ft./min.

* * * * *